Oct. 26, 1954  W. T. MORGAN  2,692,906
STORAGE BATTERY
Filed May 1, 1953                            3 Sheets-Sheet 1

INVENTOR.
WILLIAM T. MORGAN
BY
McMorrow, Berman + Davidson
ATTORNEYS

Oct. 26, 1954
W. T. MORGAN
2,692,906
STORAGE BATTERY
Filed May 1, 1953
3 Sheets-Sheet 3
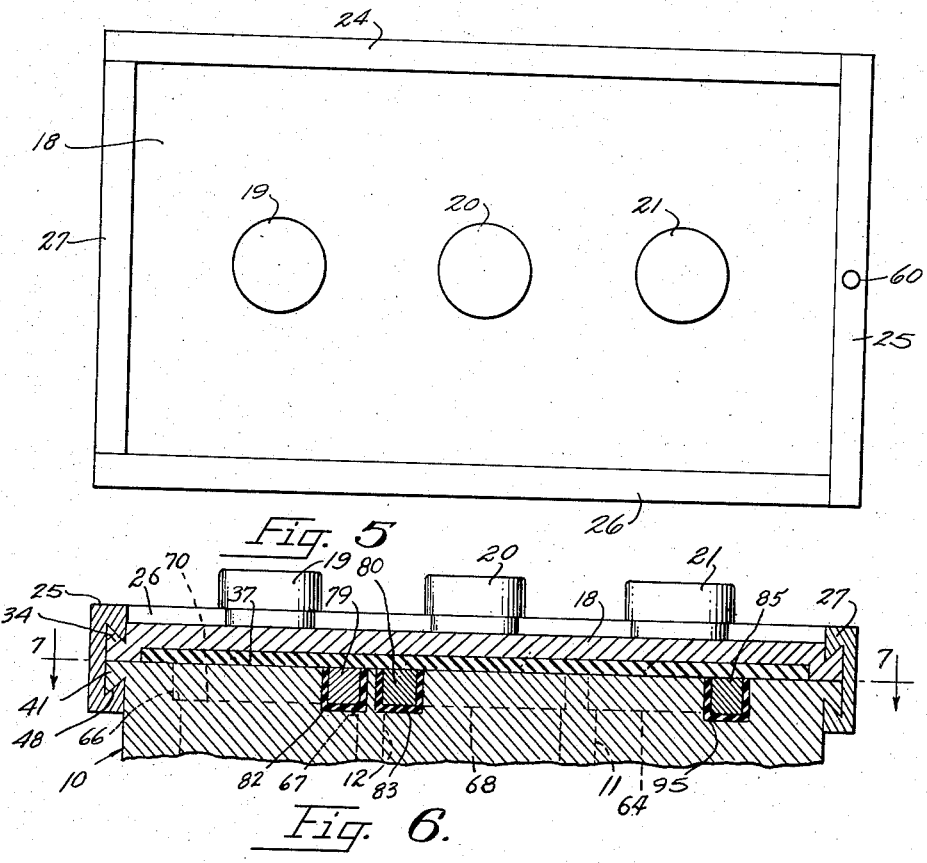
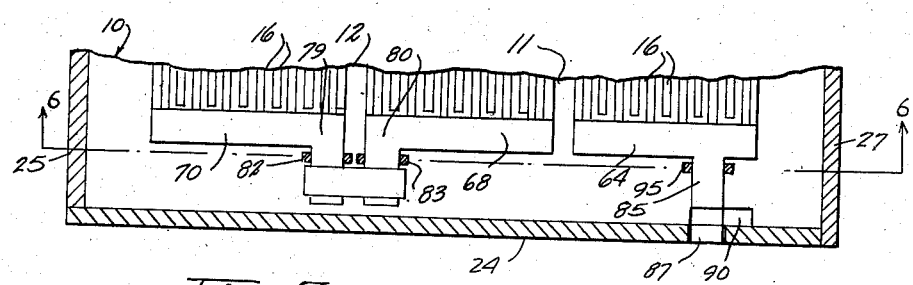
Inventor
WILLIAM T. MORGAN
By McMorrow, Berman & Davidson
Attorneys Patented Oct. 26, 1954

2,692,906

UNITED STATES PATENT OFFICE 2,692,906

STORAGE BATTERY

William T. Morgan, McKees Rocks, Pa.

Application May 1, 1953, Serial No. 352,340

7 Claims. (Cl. 136—166)

This invention relates to storage batteries and more particularly to a storage battery having a removable top or cover to provide access to the interior of the battery for repair or replacement of the battery plates.

It is among the objects of the invention to provide a storage battery having a separate top or cover and means detachably securing the top or cover to the body of the battery for removal of the cover to provide access to the interior of the battery for repair or replacement of the battery plates; which materially extends the useful life of the battery by rendering the operation of repairing or replacing used up plates quick, easy and convenient; which provides against leakage of acid from the battery and simplifies the connection and disconnection of battery cables; and which is simple and durable in construction, economical to manufacture, and efficient and effective in use.

Other objects and advantages will become apparent from a consideration of the following description and the appended claims in conjunction with the accompanying drawings wherein:

Figure 3 is a perspective view of means provided within the battery for interconnecting groups of battery plates;

Figure 4 is an exploded perspective view of means for connecting a battery cable to the battery;

Figure 5 is a top plan view of the battery;

Figure 6 is a fragmentary cross sectional view on the line 6—6 of Figure 7; and

Figure 7 is a fragmentary cross sectional view on the line 7—7 of Figure 6.

Figure 1:
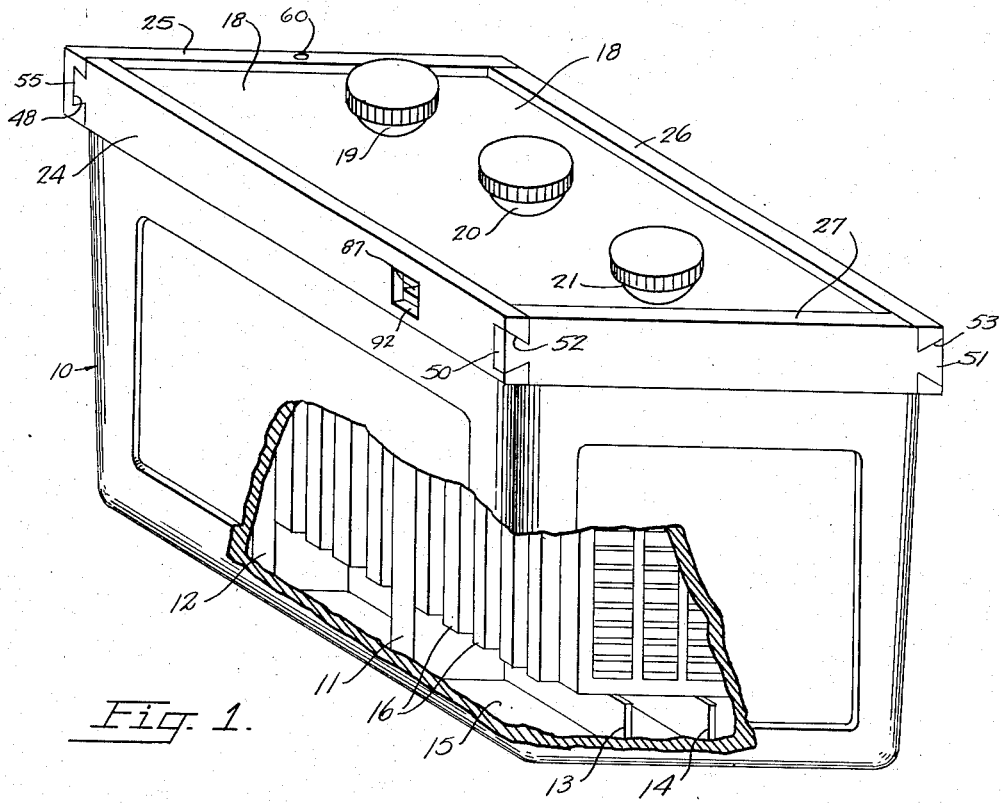
Figure 1 is a perspective view of a storage battery illustrative of the invention with a portion broken away and shown in cross section to better illustrate the construction thereof.

With continued reference to the drawings, the battery comprises a hollow body, generally indicated at 10, of rectangular shape and having an open top. This body provides the receptacle for the battery and, in the arrangement illustrated, is provided interiorly thereof with two transversely extending partition walls 11 and 12 which divide the space within the receptacle into three battery cell compartments of equal size. Ribs, as indicated at 13 and 14, extend longitudinally of the battery in spaced apart and substantially parallel relationship to each other and project upwardly from the inner surface of the bottom wall 15 of the battery receptacle to provide supports for the bottom edges of the battery plates 16 and to provide a sediment space below the bottom edges of the battery plates. The plates 16 are of well known construction and are divided into groups with an equal number of plates in each group and each group disposed in a corresponding cell compartment between the partition walls 11 and 12 and between the partition walls and the adjacent end walls of the battery.

The open top of the battery is closed by a flat cover 18 of rectangular shape having filler spouts 19, 20 and 21 extending upwardly from the top surface thereof and provided with openings extending through the cover plate for the replenishment of fluid in the battery and the cover is detachably secured to the top portion of the body 10 by grooved strips, as indicated at 24, 25, 26 and 27, with the strips 24 and 26 extending one along each side of the battery receptacle and the cover, and the strips 25 and 27 extending one along each end of the receptacle and the cover.

Figure 2:
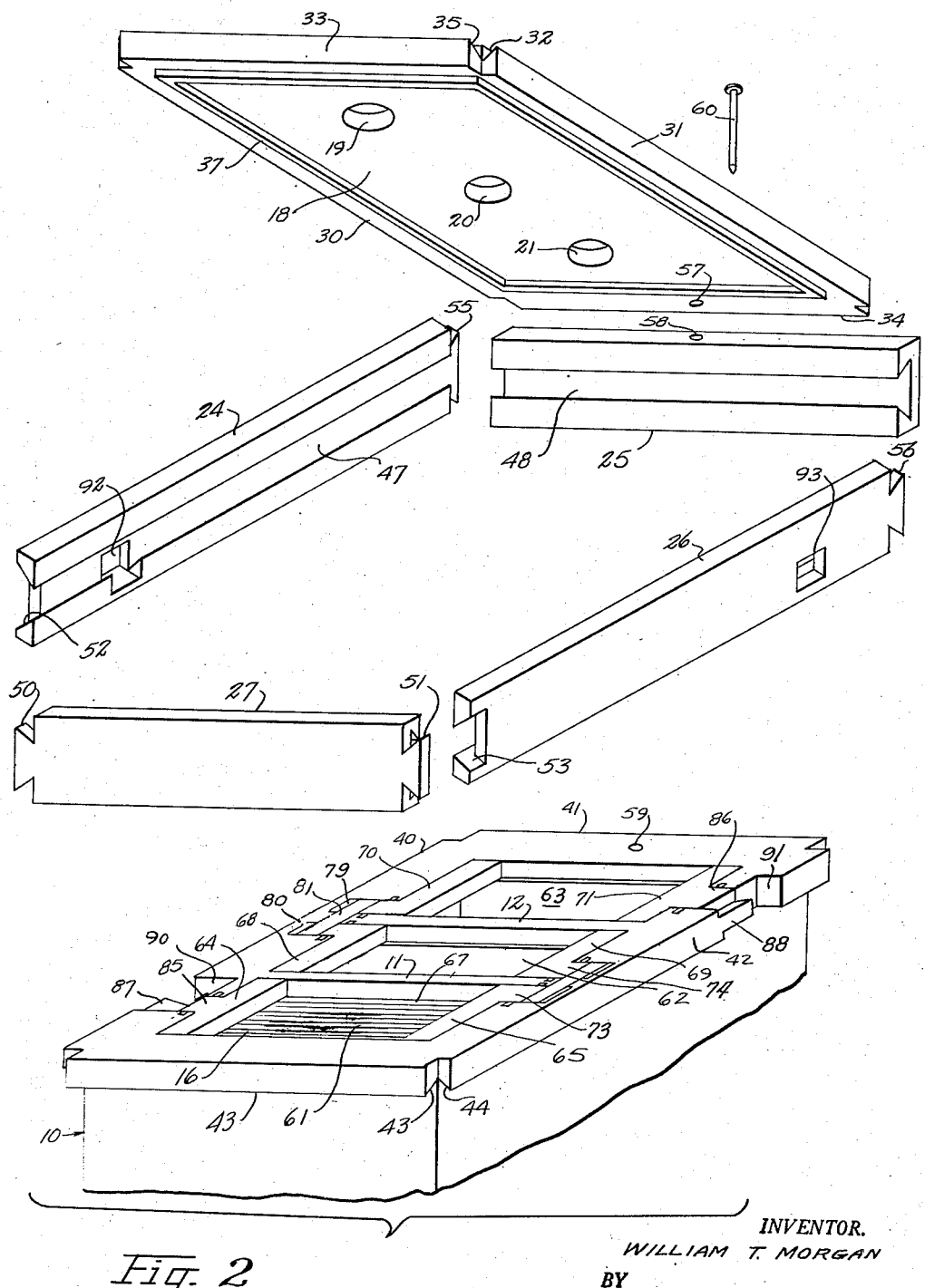
Figure 2 is an exploded perspective view of the upper portion of a storage battery illustrative of the invention.

The cover 18 is provided with grooved splines 30 and 31 extending along the respectively opposite side edges thereof and each provided in its top surface with a V shaped groove, as indicated at 32 for the spline 31 in Figure 2, and with grooved splines 33 and 34 extending along the respectively opposite end edges of the cover and each provided in its top surface with a V shaped groove, as indicated at 35 in Figure 2 for the spline 33. The cover is provided in its bottom surface with a groove of rectangular shape disposed within the limits of the splines 30, 31, 33 and 34 and a packing member 37 of rectangular cross sectional shape and of a resiliently compressible, acid resistant material, such as a synthetic rubber material, is disposed in this groove and extends somewhat below the bottom surface of the cover to engage the surface of the receptacle 10 at the open end of the receptacle.

The receptacle is provided around its open, top end with grooved splines 40, 41, 42 and 43 of the same size and shape as the corresponding splines on the cover 18. The receptacle splines 40 and 42 extend along the respectively opposite sides of the receptacle and have V shaped grooves in their bottom surfaces, as indicated at 44 for the spline 42, and the splines 41 and 43 extend one along each end edge of the receptacle and are provided in their bottom surfaces with V shaped grooves, as indicated at 45 for the spline 43. When the cover 18 is in place on the top end of the receptacle 10, the splines of the cover are superimposed on the corresponding splines of the receptacle and each pair of superimposed splines of the cover and the receptacle provides a laterally projecting tongue of dove-tailed cross sectional shape, as illustrated in Figure 6. The strips 24, 25, 26 and 27 are provided in their inner sides with longitudinally extending grooves disposed medially of the width of the strips and of dove-tailed cross sectional shape, as indicated at 47 and 48 for the strips 24 and 25 respectively, in Figure 2, and the grooves in the locking strips slidably receive the corresponding laterally projecting tongues of the receptacle and cover and securely lock the cover to the receptacle with the gasket 37 compressed between the cover and the receptacle when the tongues are fully received in the grooves of the corresponding strips.

The splines 40, 41, 42, 43 and the splines 30, 31, 33, 34 constitute attaching means which extend along the marginal edges of the receptacle 10 adjacent the open top thereof and along the marginal edges of the cover 18, respectively. The securing strips 24, 25, 26, 27 constitute interengaging means which extend between and connect the attaching means of the receptacle 10 and the attaching means of the cover 18.

The end strip 27 is provided at its opposite ends with outwardly extending tongues 50 and 51 of dove-tailed cross sectional shape and the side strips 24 and 26 are provided in their ends adjacent the end strip 27 with beveled notches 52 and 53 respectively, which receive the corresponding tongues 50 and 51 on the end strip 27 when the strips are assembled with the receptacle and the cover in the manner illustrated in Figure 1. At their ends adjacent the end strip 25 the side strips 24 and 26 are provided with outwardly extending tongues 55 and 56 respectively, which are received in the end portions of the groove 48 in the end strip 25 when the strips are assembled with the cover and the receptacle, the end strip 25 having a length such that it extends between the outer surfaces of the side strips 24 and 26 and fully receives the tongues 55 and 56.

In assembling the device, after the cover has been properly placed on the open top of the receptacle 10, the end strip 27 is first slid along the tongue provided by the cover spline 33 and the receptacle spline 43 with this tongue received in the groove of the strip 27 until the ends of the strip 27 are flush with the ends of the spline 43. The side strips 24 and 26 are then slid along the tongues provided by the cover spline 30 and the receptacle spline 40 and by the cover spline 31 and the receptacle spline 42 until the tongues 50 and 51 on the end strip 27 are received in the corresponding notches 52 and 53 in the ends of the side strips 24 and 26. The end strip 25 is then slid along the tongue provided by the cover spline 34 and the receptacle spline 41 until this tongue is fully received in the groove 48 of the strip 25 and the outwardly projecting tongues or tabs 55 and 56 on the side strips are received in the end portions of the groove 48 of the end strip 25. An aperture 57 extends through the portion of the cover adjacent the spline 34, an aperture 58 extends transversely through the strip 25 and registers with the aperture 57 when the strip 25 is in proper position in the assembly, and an aperture 59 is provided in the top surface of the receptacle 10 adjacent the spline 41 and registers with the apertures 57 and 58. A fastener 60, such as a metal pin, is extended through the hole provided by the registering apertures 57, 58 and 59, and secures the strip 25 in position in the assembly, and locks cover 18 to receptacle 10.

The partitions 11 and 12 divide the interior of the receptacle 10 into three battery cells 61, 62 and 63, of equal size extending transversely of the interior of the receptacle and connector bars 64 and 65 extend across the respectively opposite ends of the cell 61. The active plates of the plates 16 in the cell 61 are connected to the bar 64 and the separator plates are connected to the bar 65 in the manner well known in the construction of storage batteries. At their ends, the bars 64 and 65 rest upon shoulders 66 and 67 provided in the corresponding end wall of the receptacle and in the partition wall 11 near the top of the end wall and the partition wall and these bars support the plates in proper position in the corresponding battery cell.

The connector bars 68 and 69 extend across the respectively opposite ends of the cell 62 and similar connector bars 70 and 71 extend across the respectively opposite ends of the cell 63, the bars 68, 69, 70 and 71 being supported at their ends on structural shoulders provided on the partition walls 11 and 12 and the end wall of the receptacle from which the spline 41 extends to support the connected battery plates in the corresponding cell compartments of the battery. The connector bars may all be of substantially the same size and shape and are preferably of rectangular shape and formed of a suitable electrically conductive material, such as lead.

The connector bars 68 and 70 are connected together and the connector bars 65 and 69 are connected together to place the cells of the battery in series with each other, the manner of connecting the corresponding connector bars being illustrated in Figure 3 for the bars 65 and 69.

As illustrated in Figure 3, the bar 65 is provided at one end with a perpendicularly disposed extension 73 which is received in a recess provided in the top portion of the battery receptacle, so that the top surface of the bar 65 and the top surface of the extension 73 are flush with the top surface of the receptacle. The extension 73 is at the end of the bar 65 adjacent the bar 69, and the bar 69 is provided at its end adjacent the bar 65 with a perpendicularly projecting extension 74 which is spaced from and parallel to the extension 73 and also received in a recess in the top portion of the receptacle. The extensions 73 and 74 are provided near their outer ends with transversely extending notches 75 and 76 respectively, opening to the top surfaces of the extensions, and a wedge 77 of a suitable electrically conductive material, such as lead or copper, extends transversely of the extensions 73 and 74 and is forced into the notches 75 and 76 to electrically interconnect the extensions 73 and 74 and the associated connector bars 65 and 69. The notches 75 and 76 are tapered downwardly and the wedge 77 is also tapered in thickness from its top to its bottom surface and has a longitudinally extending groove 78 in its bottom surface, so that it can be forced into a pressed fit in the notches 75 and 76 with its top surface flush with the top surfaces of the extensions 73 and 74 and the top surface of the receptacle 10. The connector bars 68 and 70 are provided with extensions 79 and 80 corresponding to the extensions 73 and 74 and a wedge 81 interconnects the extensions 79 and 80 to electrically interconnect the bars 68 and 70, as described above in connection with Figure 3.

In order to preclude leakage of battery fluid from the battery around the extensions 73, 74, 79, 80, 85, and 86, the upper portion of the receptacle 10 is provided with grooves disposed in the recesses receiving these extentions, and extending one around each extension intermediate the length thereof. Gaskets of suitable resiliently compressible material, as indicated at 82, 83, 95 for the extensions 79, 80, 85 in Figure 6, are disposed one in each of these grooves and closely surround the corresponding extensions to provide leakproof joints in the extension receiving recesses between the connector bar extensions and the adjacent portions of the receptacle of the battery.

The connector bars 64 and 71 are provided intermediate their length with outwardly projecting, perpendicularly disposed extensions 85 and 86 disposed in recesses in the upper portion of the battery receptacle, and the outer portions of these extensions 85 and 86 are reduced in thickness and inwardly tapered to provide tongues, as indicated at 87 and 88, respectively, disposed in openings in the splines 40 and 42 of the battery receptacle 10. The openings or notches 90 and 91 in the splines 40 and 42 have a length greater than the width of the extensions 85 and 86 and a depth substantially equal to the length of the corresponding tongues 87 and 88. The side strips 24 and 26 are provided with openings 92 and 93 respectively, having a length substantially equal to the width of the tongues 87 and 88 which openings register with the portion of the openings 90 and 81 in the receptacle splines in which the tongues 87 and 88 are disposed when the side strips are slid into operative position on the receptacle splines.

The gasket 37 carried by the battery cover 18 registers with the upper ends of the gaskets extending around the connector bar extensions to complete the seal around each of the extensions, as well as between the cover and the portions of the top surface of the battery between the connector bar extensions.

The tongues 87 and 88 on the outer ends of the extensions 85 and 86 are provided for the purpose of connecting the battery cables to the poles of the battery, and each battery cable, as indicated at 96 in Figure 4, is provided on one end with a block 97 of rectangular shape which block is formed of a suitable electrically conductive material, and provided in its end remote from the associated battery cable with an outwardly tapering notch 98 which slidably receives a corresponding pole tongue 87 or 88 of the battery. The blocks are first inserted through the corresponding openings 92 and 93 in the side strips 24 and 26, the length of the openings 90 and 91 in the battery receptacle permitting the blocks to be inserted into these openings alongside the corresponding tongues. The side strips 24 and 26 are then moved longitudinally until the tongues are received in the notches in the cable blocks to firmly secure the cables to the pole tongues in electrically conductive engagement therewith. This arrangement greatly facilitates the connection of the cables to the battery and the disconnection of the cables therefrom whenever it becomes necessary to remove the battery.

The battery can be easily disassembled by first removing the fastener pin 60, then removing the end strip 25, the side strips 24 and 26 and the end strip 27, in the order enumerated, to free the cover 18 from the receptacle 10 and by then removing the cover to expose the battery plates and connector bars in the battery cell compartments. After the cover has been removed, the connector bars with the associated plates can be lifted out of the corresponding cell compartments and the plates repaired and returned to the compartments, or new plates substituted for wornout plates removed from the cell compartments of the battery.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A storage battery comprising a hollow receptacle having an open top, partition walls in said receptacle dividing the interior thereof into separate battery cell compartments, groups of battery plates disposed one group in each of said compartments, connector bars disposed one at each end of each compartment interconnecting and supporting associated plates, means electrically interconnecting said connector bars, means connected to selected connector bars and accessible from the exterior of said receptacle for connecting battery cables to said selected connector bars, a cover disposed in closing relationship to the open top of said receptacle, grooved splines extending one along each edge of said cover, grooved splines extending one along each edge of the top of said receptacle and underlying corresponding splines on said cover, each pair of superposed splines providing a tongue of dove-tailed cross sectional shape projecting laterally from said receptacle and said cover and extending longitudinally thereof, and securing strips having grooves of dove-tailed cross sectional shape extending longitudinally thereof, respectively receiving said tongues and securing said cover to said receptacle.

2. A storage battery comprising a hollow receptacle having an open top, partition walls in said receptacle dividing the interior thereof into separate battery cell compartments, groups of battery plates disposed one group in each of said compartments, connector bars disposed one at each end of each compartment interconnecting and supporting associated plates, means electrically interconnecting said connector bars, means connected to selected connector bars and accessible from the exterior of said receptacle for connecting battery cables to said selected connector bars, a cover disposed in closing relationship to the open top of said receptacle, grooved splines extending one along each edge of said cover, grooved splines extending one along each edge of the top of said receptacle and underlying corresponding splines on said cover, each pair of superposed splines providing a tongue of dove-tailed cross sectional shape projecting laterally from said receptacle and said cover and extending longitudinally thereof, and securing strips having grooves of dove-tailed cross sectional shape extending longitudinally thereof, respectively receiving said tongues and securing said cover to said receptacle, one of said strips having tongues of dove-tailed cross sectional shape projecting one from each end thereof, the associated strips having notches in their ends adjacent said one strip respectively receiving the tongues projecting from said one strip and having outwardly extending tongues of dove-tailed shape at their opposite ends received in the groove of the fourth strip.

3. A storage battery comprising a hollow receptacle having an open top, partition walls in said receptacle dividing the interior thereof into separate battery cell compartments, groups of battery plates disposed one group in each of said compartments, connector bars disposed one at each end of each compartment interconnecting and supporting associated plates, means electrically interconnecting said connector bars, means connected to selected connector bars and accessible from the exterior of said receptacle for connecting battery cables to said selected connector bars, a cover disposed in closing relationship to the open top of said receptacle, grooved splines extending one along each edge of said cover, grooved splines extending one along each edge of the top of said receptacle and underlying corresponding splines on said cover, each pair of superposed splines providing a tongue of dove-tailed cross sectional shape projecting laterally from said receptacle and said cover and extending longitudinally thereof, securing strips having grooves of dove-tailed cross sectional shape extending longitudinally thereof, respectively receiving said tongues and securing said cover to said receptacle, a gasket interposed between said cover and the top of said receptacle providing a leakproof seal between said cover and said receptacle and gasket means providing leakproof seals between said means accessible from the exterior of said receptacle and said receptacle.

4. A storage battery comprising a hollow receptacle having an open top, partitions in said receptacle dividing the interior thereof into battery cell compartments, groups of plates disposed one group in each of said compartments, means interconnecting said groups of plates, means connected to selected groups of plates and accessible from the exterior of said receptacle for connecting battery cables to said selected group of plates, a cover disposed in closing relationship to the open top of said receptacle, attaching means extending along the marginal edges of said receptacle adjacent the open top thereof and along the marginal edges of said cover, and interengaging means extending between and connecting said attaching means of said cover and said attaching means of said receptacle.

5. A storage battery comprising a hollow receptacle having an open top, partitions in said receptacle dividing the interior thereof into battery cell compartments, groups of plates disposed one group in each of said compartments, means interconnecting said groups of plates, means connected to selected groups of plates and accessible from the exterior of said receptacle for connecting battery cables to said selected groups of plates, a cover disposed in closing relationship to the open top of said receptacle, attaching means extending along the marginal edges of said receptacle adjacent the open top thereof and along the marginal edges of said cover, interengaging means slidably mounted on and connecting said attaching means of said cover and said attaching means of said receptacle, and locking means securing said attaching means and said interengaging means together.

6. A storage battery comprising a hollow receptacle having an open top, partitions in said receptacle dividing the interior thereof into battery cell compartments, groups of plates disposed one group in each of said compartments, means interconnecting said groups of plates, terminal means connected to selected groups of plates and accessible from the exterior of said receptacle for connecting battery cables to said selected groups of plates, a cover disposed in closing relationship to the open top of said receptacle, attaching means extending along the marginal edges of said receptacle adjacent the open top thereof and along the marginal edges of said cover, and securing strips extending between and connecting said attaching means of said cover and said attaching means of said receptacle, each of said securing strips being provided with an opening registrable with the corresponding one of said terminal means when said securing strips are in place for extension therethrough of an end of a battery cable.

7. A storage battery comprising a hollow receptacle having an opening top, partitions in said receptacle dividing the interior thereof into battery cell compartments, groups of plates disposed one group in each of said compartments, means interconnecting said groups of plates, a cover disposed in closing relationship to the open top of said receptacle, attaching means extending along the marginal edges of said receptacle adjacent the open top thereof, and along the marginal edges of said cover, securing strips extending between and connecting said attaching means of said cover and said attaching means of said receptacle, said receptacle being provided with a notch in the open top edge adjacent each end thereof, and terminal means connected to selected groups of plates and accessible from the exterior of said receptacle for connecting battery cables to said selected groups of plates, each of said terminal means having a projection positioned in the adjacent one of said notches, each of said securing strips being provided with an opening registrable with the corresponding one of said terminal means projections for extension therethrough of an end of a battery cable engageable with the corresponding projection.

References Cited in the file of this patent

UNITED STATES PATENTS

| Number | Name | Date |
|---|---|---|
| 1,829,935 | Klock | Nov. 3, 1931 |